(12) United States Patent
Smith et al.

(10) Patent No.: US 10,587,727 B2
(45) Date of Patent: Mar. 10, 2020

(54) METHOD AND SYSTEM FOR INTEGRATED OPTIMIZED REPORTING

(71) Applicant: Avaya Inc., Santa Clara, CA (US)

(72) Inventors: Lynn Smith, Westminster, CO (US); Sheila Higgins, Broomfield, CO (US); Marc A. Geist, Broomfield, CO (US); Hongguang Li, Broomfield, CO (US); Stan Wilkison, Denver, CO (US); Stuart M. Shepherd, Thornton, CO (US); Dwayne W. Ockel, Northglenn, CO (US); Gregory P. Schin, Highlands Ranch, CO (US)

(73) Assignee: Avaya Inc., Santa Clara, CA (US)

( * ) Notice: Subject to any disclaimer, the term of this patent is extended or adjusted under 35 U.S.C. 154(b) by 473 days.

(21) Appl. No.: 15/285,302

(22) Filed: Oct. 4, 2016

(65) Prior Publication Data

US 2018/0097913 A1 Apr. 5, 2018

(51) Int. Cl.
*G06F 15/16* (2006.01)
*H04L 29/08* (2006.01)
*H04L 29/06* (2006.01)
*G06Q 10/00* (2012.01)
*G06F 16/25* (2019.01)
*H04L 12/26* (2006.01)

(52) U.S. Cl.
CPC ............ *H04L 67/34* (2013.01); *G06F 16/252* (2019.01); *G06Q 10/00* (2013.01); *H04L 67/10* (2013.01); *H04L 67/42* (2013.01); *H04L 43/0817* (2013.01)

(58) Field of Classification Search
CPC ..... H04L 43/0817; H04L 67/10; H04L 67/34; H04L 67/42
USPC ................................ 709/201, 203, 206, 217
See application file for complete search history.

(56) References Cited

U.S. PATENT DOCUMENTS

| | | | |
|---|---|---|---|
| 5,206,903 A | 4/1993 | Kohler et al. | |
| 5,546,455 A | 8/1996 | Joyce et al. | |
| 5,787,415 A * | 7/1998 | Jacobson | ............ G06F 16/2365 |
| 5,828,747 A | 10/1998 | Fisher et al. | |
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,202,060 B1 * | 3/2001 | Tran | ...................... G06F 3/0481 |
| 6,701,345 B1 * | 3/2004 | Carley | .............. G06F 17/30368 |
| | | | 707/999.008 |
| 7,403,901 B1 * | 7/2008 | Carley | .............. G06F 17/30306 |
| | | | 705/2 |
| 8,214,340 B2 | 7/2012 | Szyperski et al. | |

(Continued)

*Primary Examiner* — Phuoc H Nguyen
(74) *Attorney, Agent, or Firm* — Shridan Ross P.C.

(57) ABSTRACT

Systems and methods of the present disclosure are directed to efficiently editing data requests sent from devices, allowing for an improved database information delivery system. In some embodiments of the present disclosure, an administrator device limits an amount of data requested based on a number of factors prior to sending the request to a server. In some embodiments, a server, after receiving a request for refreshed data, reduces the amount of data requested based on a number of factors prior to retrieving the requested data from a source and delivering the requested data to an administrator device.

20 Claims, 10 Drawing Sheets

(56) References Cited

U.S. PATENT DOCUMENTS

| | | | | |
|---|---|---|---|---|
| 8,346,645 | B1* | 1/2013 | Stewart | G06Q 10/0639 |
| | | | | 705/36 R |
| 8,806,323 | B2* | 8/2014 | Samavedula | G06F 17/245 |
| | | | | 707/752 |
| 8,856,182 | B2* | 10/2014 | Olson | G06F 17/30292 |
| | | | | 707/797 |
| 9,256,391 | B2* | 2/2016 | Sunkara | G06F 3/1438 |
| 9,286,964 | B2* | 3/2016 | Halbert | G11C 11/40603 |
| 9,959,265 | B1* | 5/2018 | Vagell | G06F 17/245 |
| 2005/0267868 | A1* | 12/2005 | Liebl | G06F 17/30554 |
| 2007/0208992 | A1* | 9/2007 | Koren | G06Q 10/10 |
| | | | | 715/212 |
| 2008/0294996 | A1* | 11/2008 | Hunt | G06Q 30/02 |
| | | | | 715/739 |
| 2010/0141470 | A1* | 6/2010 | Rowitch | G01S 19/05 |
| | | | | 340/6.1 |
| 2010/0202233 | A1* | 8/2010 | Hirobe | G11C 11/406 |
| | | | | 365/222 |
| 2012/0173476 | A1* | 7/2012 | Rizvi | G06F 17/30539 |
| | | | | 707/601 |
| 2012/0263003 | A1* | 10/2012 | Sakakibara | G11C 11/40618 |
| | | | | 365/222 |
| 2014/0317579 | A1* | 10/2014 | Dickerson | G06F 3/14 |
| | | | | 715/867 |
| 2014/0372850 | A1* | 12/2014 | Campbell | G06F 17/246 |
| | | | | 715/212 |
| 2016/0195988 | A1* | 7/2016 | Fu | G06F 3/044 |
| | | | | 345/174 |

* cited by examiner

METHOD AND SYSTEM FOR INTEGRATED OPTIMIZED REPORTING

FIELD OF THE DISCLOSURE

The present disclosure is generally directed to a method and system for retrieving and distributing various kinds of data and more specifically, to an improved database information delivery system for administrators of a call center and methods for operating the same.

BACKGROUND

Administrators of today's contact centers are required to analyze an ever-growing amount of data while detecting issues and making quick and decisive actions in real-time with respect to operations of their contact centers. To manage and review this voluminous data, administrators make heavy use of real-time reporting. The present disclosure is directed to a system of an improved database information delivery system.

BRIEF DESCRIPTION OF THE DRAWINGS

The present disclosure is described in conjunction with the appended figures, which are not necessarily drawn to scale.

DETAILED DESCRIPTION

Figure 1A:
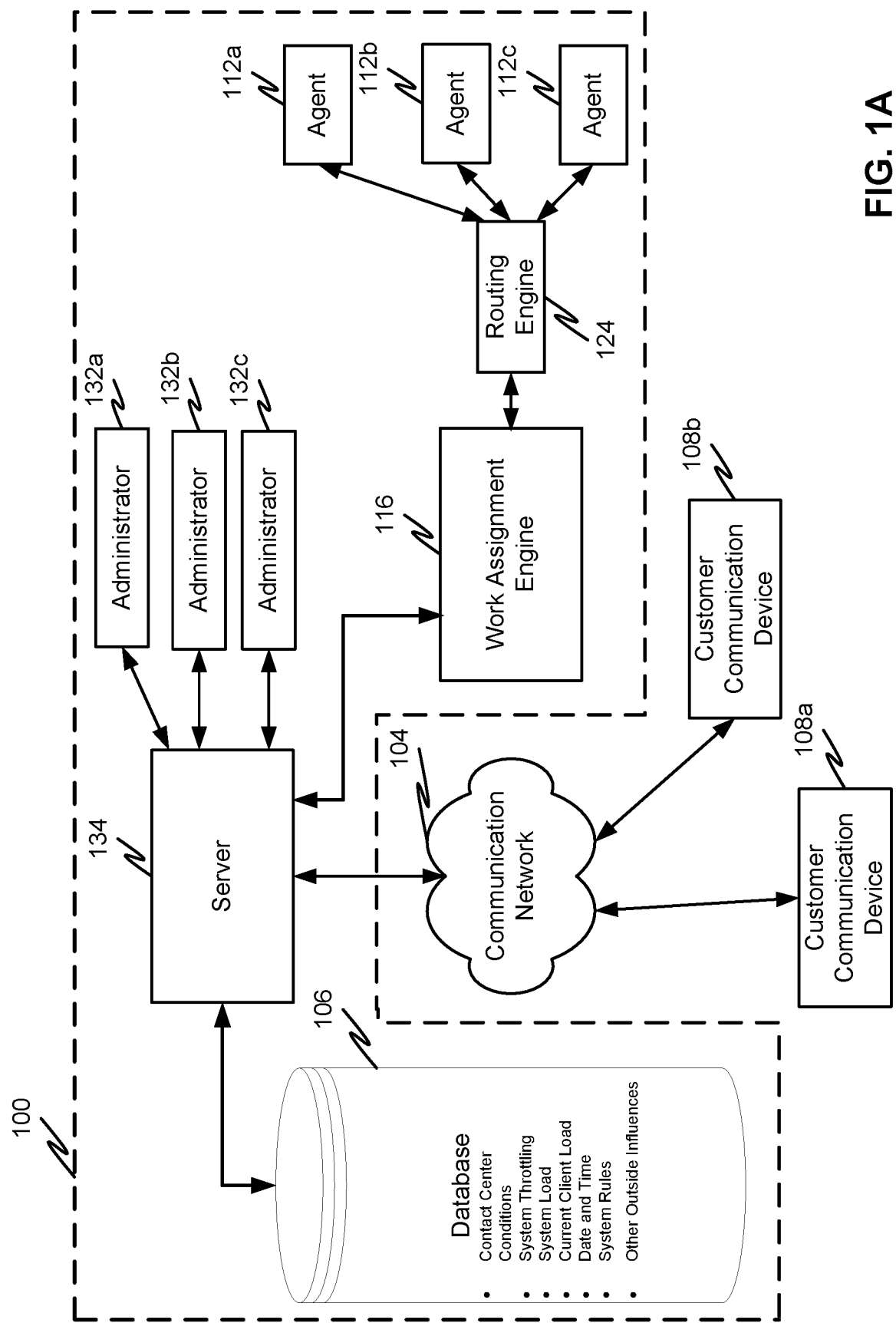
FIG. 1A depicts a general overview of a call center architecture according to an embodiment of the disclosure.

The ensuing description provides embodiments only, and it is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The ability to create real-time reports with a constantly growing amount of data creates a great demand for a powerful database with intelligent delivery of data to system administrators. Administrators of contact centers require the most up-to-date data from their network. The most current information equips these administrators to take quick and decisive actions when problems are observed. To enable this real-time reporting, administrators typically set up and run real-time reports at the fastest allowable refresh rates to make sure what they are observing is the most current.

Conventional methods of refreshing report data at short intervals, however, are resource intensive. Every time an administrator requests a refresh of report data, a large amount of information must be transmitted from a server to the administrator's device. This creates a huge burden on the network, and this burden multiplies with each additional administrator device. A network with a large number of administrators accessing and constantly refreshing the same data is an inefficient system that is demanding for even a powerful network.

Often when a request for refreshed data is made, an administrator likely will not actually require all the data requested and received. In some cases, not all data will change as often as other data. In other cases, an administrator may simply not be interested in certain sections of the data.

Similarly, if an administrator is not currently watching an active report, the resources being used to keep the report current are wasted and a burden on the network. Examples of this include when an administrator walks away from their workstation, when another application hides the running report, when a screen saver is activated, when the computer screen is locked, etc.

Resources are also wasted when unchanging data is repeatedly queried. These wasted resources are multiplied by any number of administrators each running multiple reports and result in huge amounts of wasted computing resources. In large contact centers, hundreds of administrators and supervisors can be running real-time reports at high refresh rates (e.g. every three seconds). Many complex reporting requests at high refresh rates can create stress on the network. This stress may cause an overload on the system, and in turn the quality of real-time reporting may be impacted for all users. This is a problem that grows exponentially as more systems and databases combine and integrate data, especially for large contact centers.

The proposed disclosure solves this and other issues by providing an intelligence component that is integrated with the reporting system. The disclosure provides dynamic runtime modification for variable refresh rates, intelligent queries, and other integrated optimization for contact center reporting to diminish system slowing and/or failure and minimize the reporting impact on overall system performance. Conventional approaches addressing this issue may automatically set the refresh rate depending on the load of the network; however, the refresh rate for conventional systems is typically set at the table level. The current disclosure describes a system which, among other improvements, determines which columns, rows, and/or cells of the table are used/not used and adjusts the column refresh rate automatically and/or by user input.

Embodiments of the present disclosure proposed herein provide one or more mechanisms to adjust the refresh rate of cells, rows, and/or columns in one or more reports in a real-time reporting system based on criteria such as load on the system, reports or parts of reports obscured by other windows/screensavers, frequency of data change, and areas of reports outside of administrative focus in order to maximize system performance. These and numerous other advantages of the present disclosure will be apparent from the description set forth herein.

This disclosure works by automatically optimizing reporting performance. Upon receiving a request from a system administrator's computing device for a refreshing of data, the disclosure determines what data should be refreshed to the administrator's computing device based on a number of factors and rules. This is especially effective where frequent repeated querying of data is involved (e.g., real time reporting), whether by a single system administrator or by a large number of administrators around the world. This automatic adjustment of a reporting system's behavior proactively diminishes system overload and/or failure and minimizes the reporting impact on overall system performance by ensuring the refreshing of data is performed in an efficient manner.

This disclosure provides optimization by integrating an intelligence component into the reporting system. The intelligence component interacts with the reporting systems on both an administrator device and a server to (i) dynamically adjust refresh rates; (ii) dynamically adjust the scope of queries to make them more efficient; (iii) dynamically suspend report refreshing while the user is not present; (iv) remove unneeded row and column data from queries based on rules regarding factors such as obscured reports, or user absence; and (v) determine simultaneously queried data so as to not duplicate queries for the same data.

The intelligence component, in some embodiments, uses a programmable rules engine. The rules engine allows administrators to (i) define rules for the dynamic increase/decrease frequency of refreshes on rows and columns of data; (ii) define rules for refresh frequency (increasing or decreasing) of some rows/columns they are more interested in (e.g., a particular skill or set of skills, a particular agent or group of agents, etc.); (iii) define rules for administrator priority or report type priority to guarantee best refresh rate possible when necessary; and (iv) define rules for reporting system throttling based on system overload.

The system, in some embodiments, exhibits both client and server intelligence components, and the components can communicate with each other. For instance, the server can alert administrator devices to system overload conditions. The client can then execute logic to reduce or suspend data requests based on rules engine logic. The rules engine is flexible and can take many things into consideration, such as (i) current client or server load; (ii) administrator priority (e.g. login id or job function may get higher refresh priority even under load); (iii) report type; (iv) time of day; (v) date or day of week; (vi) rate of data change; (vii) administrator availability (e.g., administrator not watching monitor); (viii) client application state (e.g., hidden, partially blocked, screen saver active, screen locked, etc.); (ix) call volume; (x) agent staffing; and (xi) other outside influences, such as weather, seasonal activities, environmental conditions, etc.

The disclosure also makes use of monitoring components as inputs to the rules engine for decision making based on monitored conditions. The monitoring component may use cameras or other input devices to track where the user is concentrating and refresh that data more frequently than the rest of one or more reports (can be enabled using Amazon Fire Phone, Microsoft Kinect, etc.). Additionally, or alternatively, the monitoring component may use cameras or other input devices to determine the physical presence of a user and suspends or greatly reduces the frequency of refreshes based on user absence. The monitoring may also use intelligent application and display observing to determine which reports are actually in view and what portions of the reports are in view. Refreshed data associated with portions not in view may be suspended.

Referring to FIG. 1A, an illustrative embodiment of the present disclosure is shown. A contact center 100 is depicted to include a database 106, a plurality of agents 112*a-c*, a work assignment engine 116, a routing engine 124, a server 134, and a plurality of administrator devices 132*a-c*. While the disclosure may be used in a wide range of applications, for the purposes of explanation the disclosure will be discussed in the term of these components.

In the illustrated embodiment, the server 134 of the contact center 100 is operably connected to a number of system components. Administrator devices 132*a-c* communicate with the server 134 to access data needed for contact center analysis. Data needed for contact center analysis may include current client load, current server load, current CPU occupancy levels, administrator priority (e.g. login ID or job function of administrator may result in a higher priority), types of reports being requested by administrators, current time of day, the date, day of week, a rate of data change for the type of data being requested, availability of the administrator (e.g. whether the administrator is at the administrator device and whether the administrator is watching the monitor), administrator device state (e.g. whether a window containing data to be refreshed is hidden from display, or partially blocked by another window, whether the screensaver is active, or whether the screen is locked), call volume across the system, current agent staffing, outside influences (e.g. weather, seasonal activities, environmental conditions), and status of any server-level or administrator device-level throttling.

To illustrate an implementation of the disclosure when used by an administrator analyzing a contact center, any number of administrator devices may be connected to the server. These administrator devices may be personal computers or other computing devices with displays to be used by administrators. Administrators using these administrator devices access the data needed to analyze the contact center via the server. Often the data will appear as a table of rows and columns in a window on the administrator device. At any time an administrator device may display a number of tables of data. Each table may be filled with data obtained from the server. While the data on the server is continuously updated, the data within tables on the administrator devices may only be updated upon sending a refresh request to the server and the server delivering new data.

Data needed for contact center analysis may be accessed by the server 134 from a number of sources, including a database 106, which stores information such as contact center conditions, system throttling rules and preferences, system load rules and preferences, current client load information, date, time, other system rules and preferences, and other outside influences. Other sources of information accessed by the server 134 include a work assignment engine 116 which provides information regarding agent devices 112a-c connected to the work assignment engine via a routing engine 124, and a communication network 104 through which customer communication devices 108a-b connect to the server 134.

Among the data stored in the server 134 may be a set of agent queues. Agents using agent devices 112a-c are assigned to agent queues based upon the skills that they possess. An agent may have multiple skills, and hence may be assigned to multiple agent queues simultaneously. Also, an agent may have different levels of skill expertise, and hence may be assigned to different queues at different expertise levels. The data may contain a variety of enterprise information. For example, the data can include contact- or customer-related information, such as customer name, customer contact information, customer financial information, customer transaction history, customer class or type, account number, and the like, agent- or agent-related information, such as agent name, agent state, agent skill(s) and/or skill level(s), agent queue associations, and the like, contact center current and historic performance information, and other information that can enhance the value and efficiency of the contact processing. The data stored on the server may be configured according to a relational database architecture, an object oriented database architecture, or configured for access by another type of database architecture. Additionally, the data repository or storage may be simply a collection of one or more data files, wherein the data therein may be ordered or unordered.

The data used by administrators at administrator devices may be received from the server. This data may appear at the administrator devices as a number of tables comprising rows and columns of information. In this way, the data appears on an administrator device as a number of cells, wherein each cell corresponds to a particular row and column. Administrators are enabled to review system analytics including the data regarding agents discussed above by surveying the tables of data. The tables of data may appear on an administrator device in separate windows or as separate tabs within one window or a combination of both on the administrator device display as is well known in the art. To keep the data within the tables up-to-date, Administrators use data-refresh requests. These data-refresh requests may be automatically performed at a pre-determined or custom interval, for example every 10 seconds. The data-refresh requests may also be performed manually by an administrator at the device. A data-refresh request sends an alert to the server requesting all or a portion of the data within an associated table or group of tables.

The present disclosure presents a method and system of delivering a minimum amount of requested data in response to a data-refresh request from an administrator device. Following the generation of a refresh request, the administrator device will, prior to transmitting the request for the server, apply a number of rules, considering a number of factors in an attempt to minimize the refresh request. Following the application of the administrator-level rules, the administrator device will then transmit the minimized request to the server where additional rules may be applied. The server accepts the data-refresh request, determines an amount of data which should be refreshed and an amount of data which should not be refreshed, and delivers only the amount of data which should be refreshed. This determination may be based on a number of rules and factors which are to be considered by the server following the request. The amount of data which should be refreshed may comprise a particular group of rows or columns or cells of data.

The rules and factors used to determine which cells of data to refresh may include any number of server-wide or administrator device-level rules and preferences. As an example, some cells may contain data which changes only once a day or week. A rule may be implemented such that a request to refresh such data may be refused if it has previously been refreshed within such a time frame. Also, throttling rules may be implemented, as will be discussed below, such that the server limits all requests for refreshed data when the server CPU occupancy level surpasses a pre-determined maximum level. Alternatively, an administrator device-level throttle may be implemented in the case of a particular administrator device that requires an unusual amount of traffic. Other rules will be discussed below, including rules where the server determines characteristics of the data requested by an administrator device before determining what data to refresh.

When an administrator device displaying one or more tables of data makes a refresh request for updated data, before the request is sent to the server, the administrator device may, prior to communicating the request to the server, apply a number of rules and consider a number of factors to reduce the request. Such rules may be sent to all administrator devices, to be sorted and implemented on the administrator device level.

In order to implement an administrator-level rule, the administrator device may determine a number of factors, for example: the scope of data requested (i.e. particular rows, columns, cells included in the request), type of data requested (i.e. which particular table), whether the refresh request was automatic or a manual request, position of window (e.g. hidden, partially, hidden, minimized, open), screensaver, locked screen, and/or whether administrator is physically present at the device.

Upon receiving a request for refreshed data from an administrator device, the server may apply a number of server-level rules and consider a number of factors to additionally reduce the request to a minimum amount of data. Such rules may be accessed by the server. These rules may be stored externally on other servers or computing devices or stored within the server. Using these factors, the server is enabled to apply a number of rules to limit the request to a minimum amount.

The embodiment illustrated in FIG. 1A shows the general environment in which an administrator device 132a may request refreshed data from the server 134. The server 134 may access rules and preferences from the database 106, analyze the administrator device 132a requesting the data, analyze the situation of the other administrator devices 132b-c, and access the desired and needed data from sources such as the database 106, the communication network 104 and the work assignment engine 116.

Figure 1B:
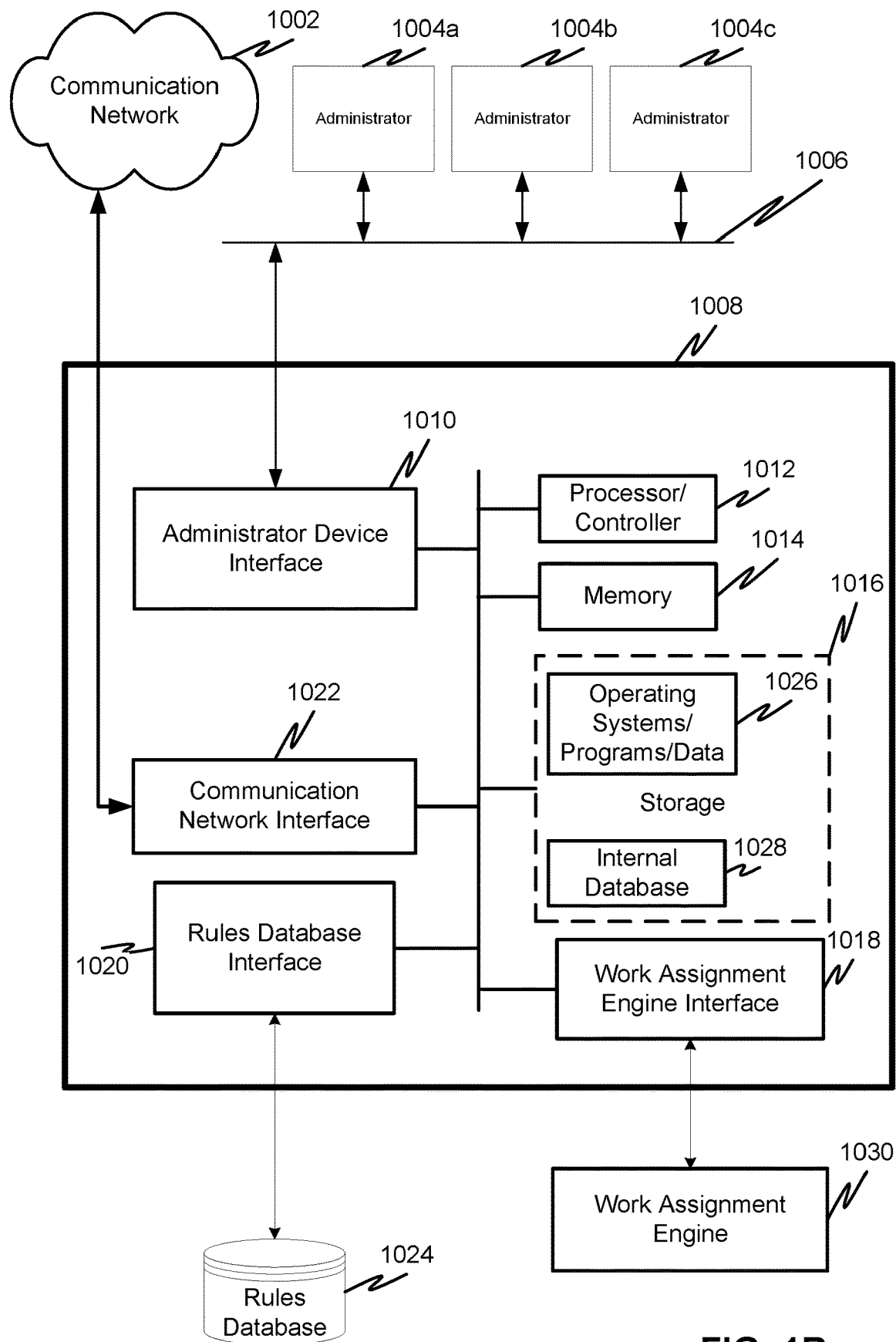
FIG. 1B illustrates internal components of a device running an embodiment of the disclosure.

Referring to FIG. 1B a functional block diagram of one possible server 1008 incorporating the teachings of the present disclosure is illustrated. As illustrated, the server 1008 includes an administrator device interface 1010, a processor/controller 1012 a memory 1014, a storage device 1016, a rules database interface 1020, and a communication network interface 1022. The storage device 1016 may contain an operating system, programs, and other data 1026 and an internal database 1028.

The server can be any architecture for directing contacts to one or more telecommunication devices. Illustratively, the server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The server typically includes a network interface card to provide services. Other types of known servers are well known in the art and therefore not described in detail herein.

The server may store data to be delivered to the administrator device upon receiving a refresh request from the administrator device. This data may be stored in a way such that it is associated with the cells of tables displayed on administrator devices. For example, each row and each column may be assigned a unique object identifier (OID). In this way, each individual cell of data may be referenced as a combination of a row OID and a column OID. An example refresh request sent by an administrator device to the server may simply refer to one particular row or column or to a group of rows and/or columns or to a single cell or group of cells by identifying the associated OIDs.

The data being requested by administrator devices may include client information sourced from agent devices. These agent devices may communicate with the server to keep tables of such data up-to-date to be accessed by both agent devices and administrator devices.

This data may be stored on the server organized as one or more tables. In this way, administrator devices may access this data by referencing unique row and column identifiers. These identifiers may be associated with the tables of data viewed on administrator devices.

The server 1008 may be in communication with a communication network 1002, a plurality of administrators 1004a-c which are in communication with the server 1008 via a network 1006. In the embodiment illustrated in FIG. 1B, three administrators are shown; however, in practice the number of administrators accessing the server 1008 may vary greatly. Additionally, while the administrator devices 1004a-c communicate with the server 1008 via network 1006, administrator devices may connect to server 1008 remotely via the communication network 1002. The server 1008 may also be in communication with a rules database 1024.

While the server may be implemented on a closed or private network between the administrator devices and the work assignment engine, the server may also connect to the internet via communication network 1002 in order to access additional information, such as data needed to determine certain factors relevant to data requested by administrator devices. Also, administrator devices may use the communication network 1002 to remotely access data from the server.

In the illustrated embodiment, when an administrator device 1004a requests a refresh of data from the server 1008, the request is received via the administrator device interface 1010. Using the server, Administrators using Administrator devices 1004a-c are enabled to access the data needed for analytical reports. The data requested by an administrator may be received at least in part by the server via a work assignment engine. Instead of simply delivering the received data from the work assignment engine to the administrator device directly, the server may operate to selectively deliver portions of the data by processing the data according to a number of rules and factors.

The following is an example of the type of data request which may be made by an administrator device. A table of data may be stored on the server. A version of this table may be delivered to a number of administrator devices. While the data in the table stored on the server may be continuously updated when new data is communicated from sources such as the work assignment engine, the data within each table displayed on each administrator device will only updated upon receiving refreshed data from the server. As discussed herein, a request for refreshed data may be automatically made from the administrator device on a particular time interval or a manual command may be made by such an administrator. This refresh request may be to refresh an entire table or a particular number of rows, columns, and/or cells. This refresh request may be made by sending the OIDs associated with the requested data to be refreshed. Additionally, a particular table of data stored on the server and accessed from a number of administrator devices may be refreshed on a number of administrator devices simultaneously. While a refresh request may designate a specific amount of data, the server may deliver data limited to a minimum amount according to the rules and factors discussed herein.

For example, an administrator at an administrator device may have a number of reports showing data on a screen of the administrator device. The data may appear as a number of windows containing spreadsheets of data, or a window with a number of tabs. Windows with reports may be minimized or hidden from view in other ways, for example a first open window containing data may be completely or partially hidden by a second open window containing data that is being displayed above the first open window.

Each report window may have an auto-refresh capability wherein a request is made to the server for the data to be refreshed on a periodic basis, e.g. every 5 seconds, every minute, every hour, or every day, etc. Additionally, a report window may have a manual-refresh capability such that an administrator at the administrator device may be able to make a refresh command to refresh the data of one or multiple reports.

In response to the request, the server 1008 may access the internal database 1028, as well as the rules database 1024 and the communication network 1002 to gather the requisite data before delivering the data to the administrator device 1004a via the administrator device interface 1010.

Rules may be system-wide rules designed to increase server functionality and save network resources by limiting the amount of traffic flowing across the network by intelligently delivering only data needed by the administrator, regardless of whether an excess amount was requested.

Some rules for determining what data to refresh may be implemented at the administrator-device level. Such rules will modify a refresh request prior to the request being sent to the server. For example, a rule may be implemented such that data not being displayed for any reason will not be updated regardless of whether a refresh request is sent. For instance, consider the case of an administrator device which currently has a first and second window displaying on the device, each containing a table of data, and the first window is displayed above and covering a portion of the second window. When a refresh request is made from the first window to refresh all data within the table in the first window, the administrator device will determine that all data in the first table is displayed and the full request will be sent to the server where additional rules may be applied. However, when a request is made from the second window, the administrator device will determine a range of cells of the table in the second window which are not obscured by the first window. The administrator device will reduce the refresh request such that it is limited to the non-hidden cells. This minimized request will then be sent to the server, where additional, server-level, rules may further be applied to the request.

These factors may be received from internet sources via the communication network 1002, from the requesting administrator device 1004*a*, other administrator devices 1004*b-c*, the work assignment engine 1030, the rules database 1024, or other sources. Upon determining the applicable rules and factors, the server, via its processor 1012 and operating systems 1026, will apply the rules to the request, limiting the request to a minimum requisite amount of data, before using the minimized request to obtain the requisite data from the work assignment engine. Finally, the server will deliver the minimized requested data to the administrator device via network 1006.

Figure 2:
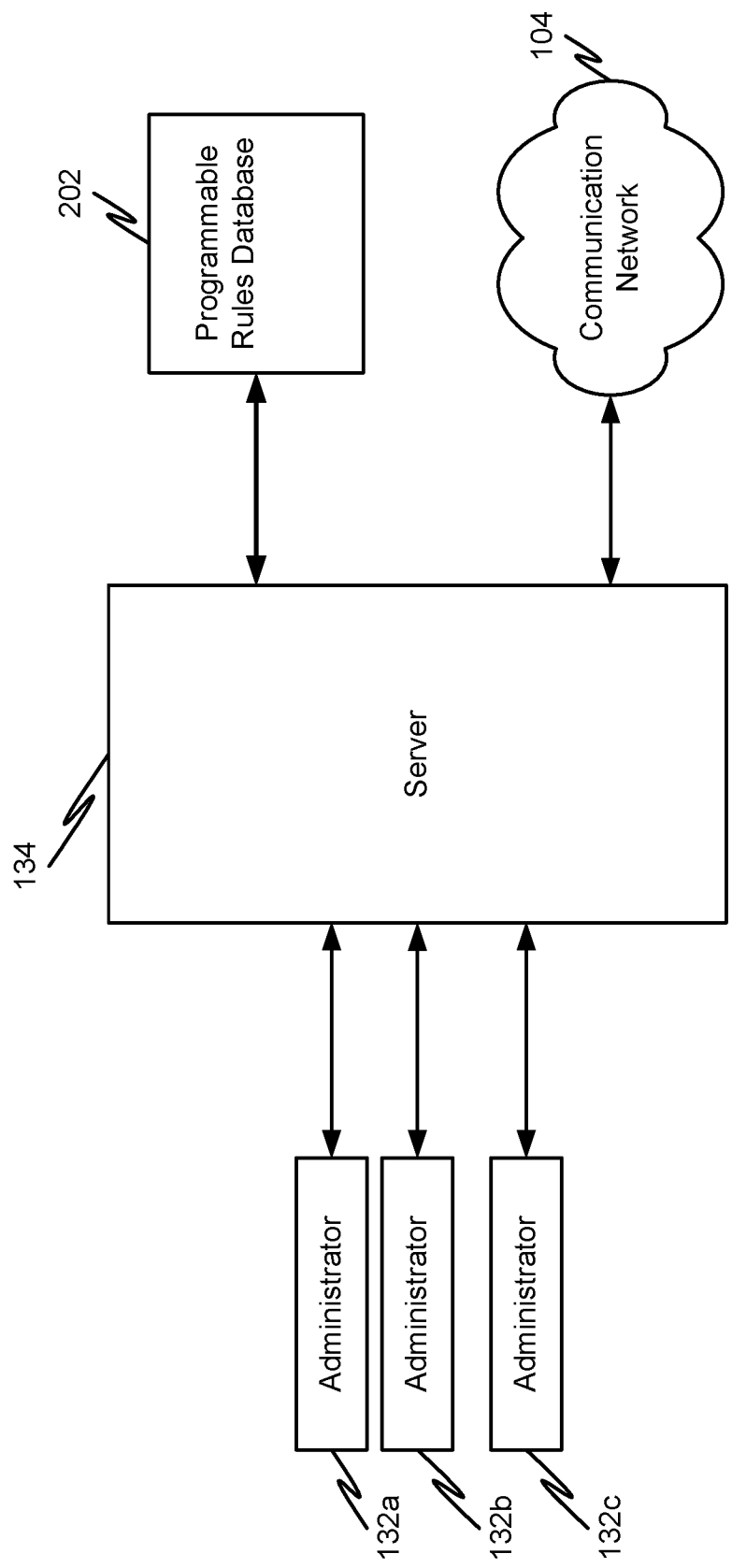
FIG. 2 depicts a server implementing an embodiment of the disclosure.

Referring to FIG. 2, a more general overview of connections to the server 134 are illustrated. The plurality of administrator devices 132*a-c* connect to the server 134. The server may be connected to the communication network 104 as well as a programmable rules database 202.

When an administrator device sends a refresh request to the server, the server will respond by accessing a database of rules. Some rules may apply to all requests for data, while other rules may apply only to requests for particular tables or particular rows and/or columns of particular tables of data. These server-level rules may be stored on and accessed from an external device such as the programmable rules database which may be a separate server or another computing device. Alternatively, this rules database may simply be stored in memory on the server.

Figure 3:
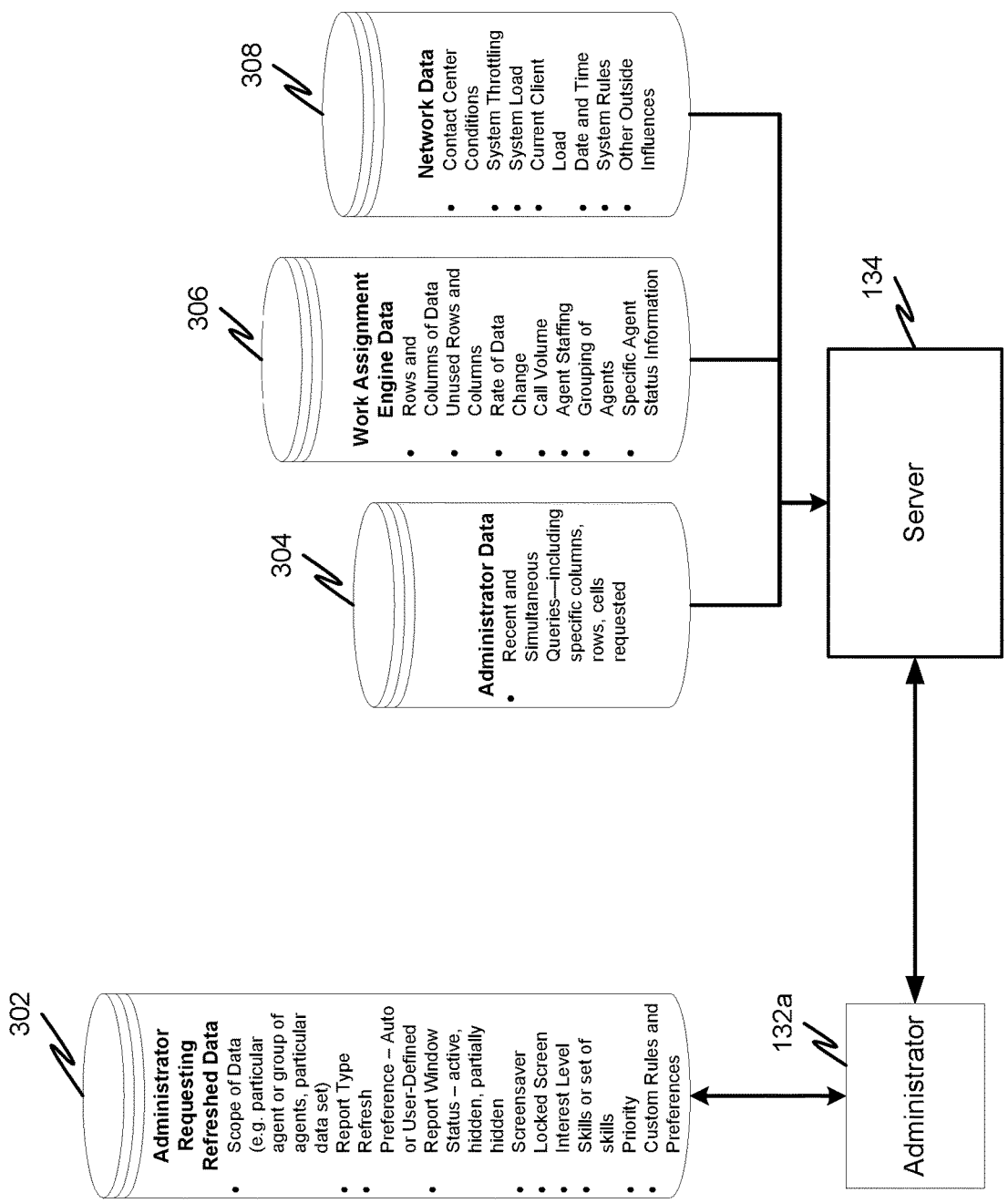
FIG. 3 depicts a detailed overview of server implementing an embodiment of the disclosure.

Referring to FIG. 3, an overview of the data that may be accessed by administrator devices 132*a-c* and the server 134 to execute the system of the disclosure is illustrated. An administrator device 132*a* connects to the server 134. The server 134 may access data from a number of sources, including, as an example, Work Assignment Engine Data 306, Network Data 308, and Administrator Data 304. This data may be communicated from external devices, such as a work assignment engine which allows the server to communicate with agent and client devices, or from Internet sources. The data may be accessed from the sources when needed to inform decisions regarding refreshed data rules or accessed prior to decisions and stored in memory on the server. This data may include data regarding administrators requesting data, for example recent and simultaneous queries including information regarding specific tables, columns, rows, and/or cells requested as well as the time and date of the requests. Data sourced from a Work Assignment Engine may include tables of data (i.e. the data being requested by administrators), unused rows and columns (i.e. tables without data, such that a refresh request for empty cells will be denied), rate of data change (such that network resources will not be wasted by administrators requesting data at a higher rate than the data changes), call volume (such that the server may implement a server-level throttling to restrict unimportant refresh requests at high-traffic network resource-intensive times), agent staffing information, agent grouping information, and specific agent status information. Other data may be sourced from the Internet or other network locations, such as contact center conditions, system throttling rules and factors, system load information, current client load, the data and time, system rules, and other outside influences.

An Administrator Device 132*a* may access data regarding the Requested Refreshed Data 302 in order to apply certain rules. As illustrated in FIG. 3, this data may include the scope of the data requested (e.g. particular agents or group of agents, or a particular data set, i.e. particular tables, rows, columns and/or cells of data), the report type, refresh preference (i.e. whether the request is made automatically or manually by an administrator), report window status (i.e. whether the window containing data requested to be refreshed is active, open, hidden, closed, and/or partially hidden), screensaver status, whether the screen of the administrator device is locked, interest level of the administrator requesting the data, particular skills or set of skills of the administrator requesting the data, priority of the administrator as compared to other administrators, and custom rules and/or preferences of the administrator and the administrator device.

The data accessed by the server 134 and the administrator device 132*a* may be used as discussed herein to apply rules according to factors upon a refresh request being made to refresh data within a table on an administrator device. The data accessed by the administrator device 132*a* may be used to apply rules minimizing a request for refreshed data prior to the request being sent to the server 134, while the data accessed by the server 134 may be used to apply rules minimizing the request after receiving the request and prior to delivering the requested data to the administrator device 132*a*.

Figure 4:
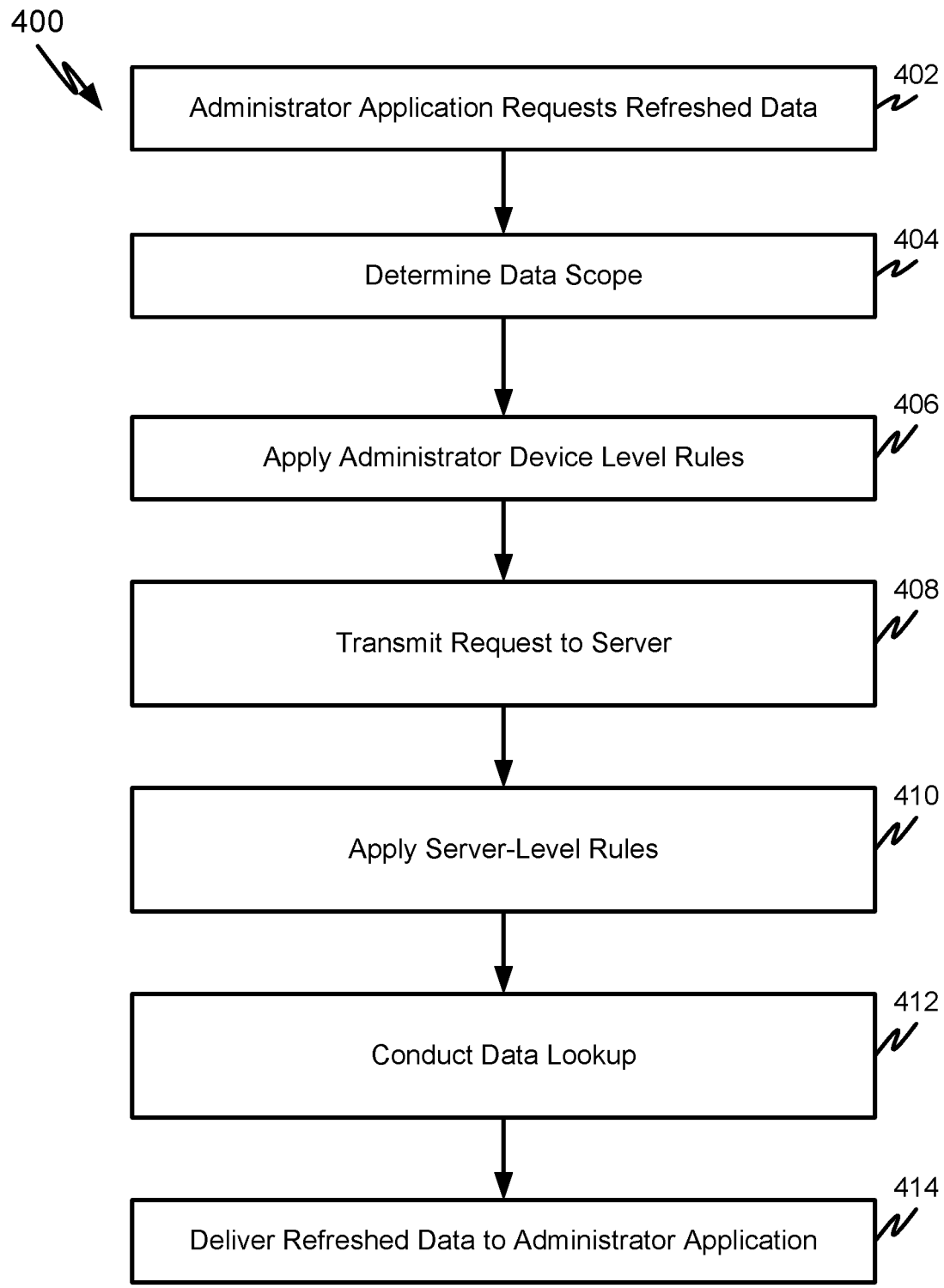
FIG. 4 depicts a flowchart for a method of delivering refreshed data according to a number of rules and determinations according to an embodiment of the present disclosure.

Referring to FIG. 4, a method 400 of delivering refreshed data from the server to an administrator device using an embodiment as in FIGS. 1*a*-3 is illustrated. The method begins at step 402, in which an administrator device requests refreshed data for a table of data being displayed on the administrator device. This request for refreshed data may automatically be made by the administrator device based on an administrator's predefined rules and preferences. Conversely, the request may be manually made by an administrator using the administrator device. The request for data may be for a specific category of data, or may be a broad request for a large amount of refreshed data. For example, the request may specify a particular table or group of tables, particular rows, columns and/or cells of tables.

Following the request for refreshed data, the method moves to step 404, in which the system determines the scope of the data related to the request. This step involves determining which tables, rows, columns and/or cells are requested to be refreshed. The scope of the data being requested may be particular rows, columns, and/or cells of a spreadsheet, entire spreadsheets, or other particular categories of data. Upon determining the scope of the data to be refreshed, a refresh request associated with the particular cells to request is generated.

At step 406, the administrator device applies administrator device-level rules to minimize the requested data dependent on a number of factors which are determined on the administrator device level. For example, a rule may be implemented such that data not currently being actively displayed on the administrator device display will not be refreshed despite a request being made. Another example rule may be that if the screensaver is active on the administrator device, or if the administrator device determines that the administrator is not physically present in front of the device, a request for refreshed data will be denied and not be sent to the server.

After applying the administrator device-level rules, the refresh request is minimized and in step 408 the minimized request is transmitted to the server. Next, in step 410, the server applies the appropriate server-level rules. After receiving the refresh request from the administrator device, the server may consult various sources, including for example one or both of internal and external databases of rules and preferences, as well as rules and preferences of the administrator device requesting the data. Using rules and preferences from these sources, the server is enabled to further define and minimize the amount of data to be delivered to the administrator device. Some of these methods of defining the amount of data to be delivered are further discussed herein regarding other embodiments and examples.

Having applied the appropriate rules, the server will have minimized the request to the specific rows, columns, and cells of the data which will be refreshed. In many cases, this amount of data will be much less than the amount of data originally requested by the administrator device in step 402. As will be discussed below, with regard to other embodiments illustrated by other figures, the system will determine the amount of data which is actually needed by the administrator device, based on a number of factors, including the state of the display of the administrator device, whether certain amounts of data are hidden from display, whether the administrator is present at the administrator device, and/or whether the data has been recently updated.

After determining the specific rows, columns, and/or cells of the data to be refreshed, the method moves to step 412, in which the system conducts a data lookup. This data lookup is limited to the specific rows, columns, and/or cells of the data to be refreshed according to the minimized refresh request.

Finally, the method moves to step 414, in which the system delivers the refreshed data to administrator application including the new data obtained via the data lookup of step 412.

Figure 5:
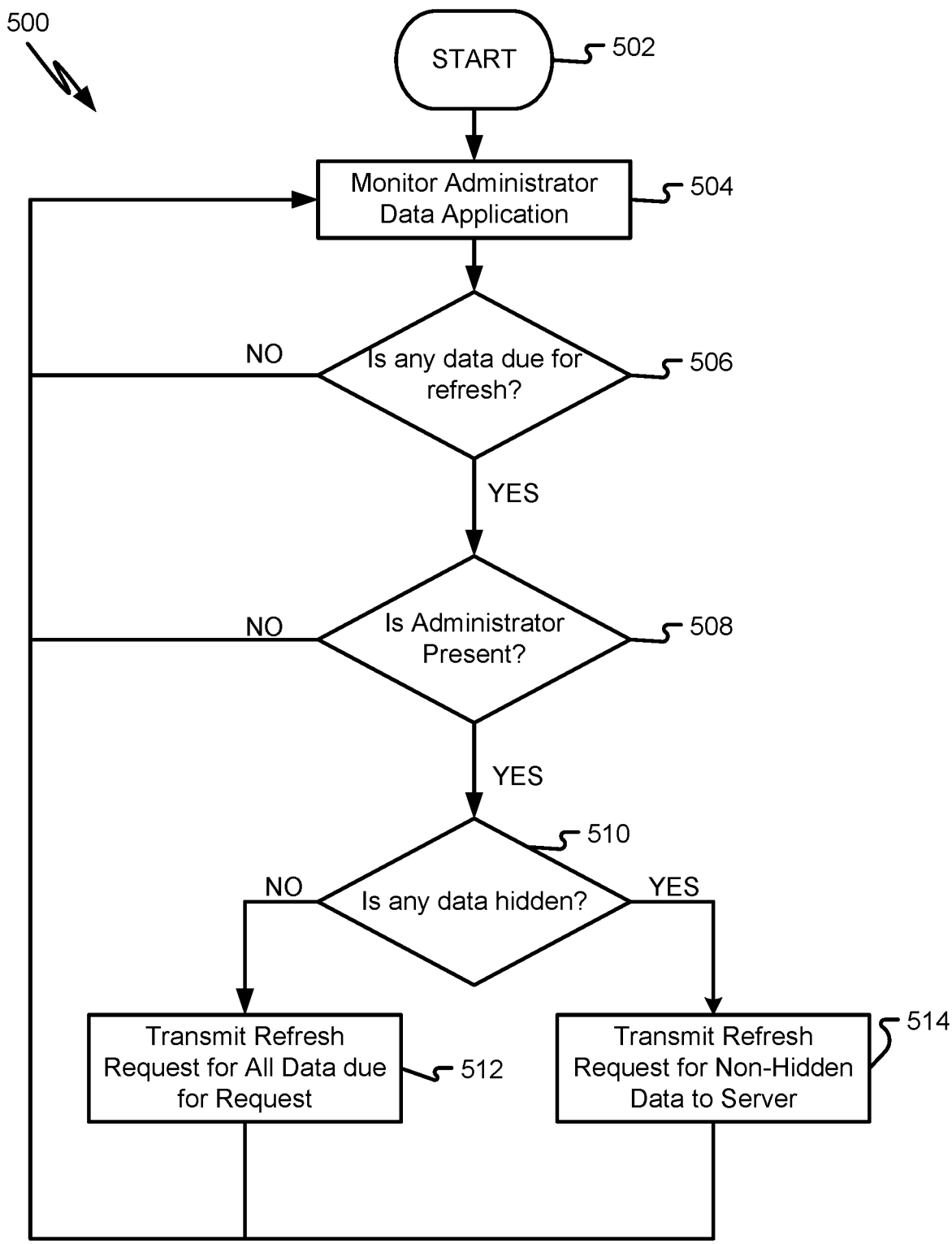
FIG. 5 depicts a flowchart for a method of refreshing monitored data for an administrator data application according to an embodiment of the present disclosure.

Referring to FIG. 5, a method 500 of determining how much, if any, data is to be refreshed according to example administrator device-level rules is illustrated. The method begins at step 502 and moves to step 504 in which an administrator data application is monitored. This monitoring step may wait until an administrator using the administrator data application manually requests a data refresh or until a predetermined automatic request for refreshed data is made.

Next, the method moves to step 506, in which the system checks whether any data is due for refresh. At this step, the system may determine what data was requested, and based on that determination determine whether a refresh is needed. For example, some categories may change only daily or weekly, and would not need to be refreshed if a refresh has been made within that amount of time. If the system determines that no data is due for refresh, the system returns to step 504 and continues monitoring the administrator data application.

If the system determines that data is due for refresh, the method moves to step 508, in which the system determines whether the administrator is present at the administrator device. For example, the administrator device may have a screensaver enabled, or the device may be locked, logged-out, or on stand-by. A contact center administrator may be viewing several reports and working through emails on an administrator device. The administrator may have several windows open concurrently on the administrator data application. The administrator device, upon generating a request for refreshed data, may determine the administrator device is being used by an administrator, and thus the request should be passed on to the server. In some situations, a monitoring device may be used such as a camera to determine whether the administrator is physically present at the device. In contrast, the administrator may not be using the device when a request for refreshed data is made. If the administrator is not present, the method returns to step 504 to continue monitoring the administrator data application. By determining whether the administrator is present, the system will avoid needlessly sending refreshed data. Every time an administrator requests a refresh of report data, a large amount of information must be transmitted from a server to the administrator's device. This creates a huge burden on the network, and this burden multiplies with each additional administrator device. A network with a large number of administrators accessing and constantly refreshing the same data is an inefficient system that is demanding for even a powerful network. Using a rule system such as the one illustrated in FIG. 5, the amount of data sent between an administrator device and the server will be limited, freeing network bandwidth for other applications and allowing for a larger number of administrator devices to access refreshed data simultaneously.

If the administrator is present, the method continues to step 510. At step 510, the system determines whether any data is hidden on the administrator device. To determine whether any data is hidden, the system may determine that a window containing a portion of the requested data is minimized, closed, or hidden behind another window. Other preferences or rules may be used to determine whether the data is "hidden" such that it need not be refreshed.

If the system determines no data is hidden, the method proceeds to step 512 and transmits a request for a refresh of all of the data requested and due to be refreshed. If the system determines some data is hidden on the administrator device display, the method proceeds to step 514 and requests a refresh of only the non-hidden data. In this way, data refresh for windows obscured by other windows is not performed because the system has recognized that the data is obscured. These requests are sent to the server where server-level rules may additionally be applied to further minimize the request. Following both of steps 512 and 514, the method returns to step 504 and continues monitoring the administrator data application. As such, on a subsequent passing through the steps of the method, a window which had been obscured may be no longer obscured, at which point the data in the window will again be refreshed.

For instance, if an administrator device currently has a first and second window displaying on the device, each containing a table of data, open and the first window is displayed above and covering a portion of the second window, a rule may apply to minimize the data requested to only that in the first window and the portion of the second window not covered (i.e. obscured) by the first. When a refresh request is made from the first window to refresh all data within the table in the first window, the administrator device will determine that all data in the first table is displayed and not obscured and the full request will be sent to the server, where additional rules may be applied. However, when a request is made from the second window, the administrator device will determine a range of cells of the table in the second window which are not obscured by the first window. The administrator device will reduce the refresh request such that it is limited to the non-hidden cells. This minimized request will then be sent to the server, where additional, server-level, rules may further be applied to the request.

As another example, while the first and second window may be open on the administrator device, the first window may completely cover the second window, or the second window may be minimized and thus no data within the second window may be displayed. In such a situation, a rule may apply such that a request for refreshed data including data contained within the second window may be minimized before being sent to the server to exclude data contained within the second window (i.e. not displayed on the administrator device).

Figure 6:
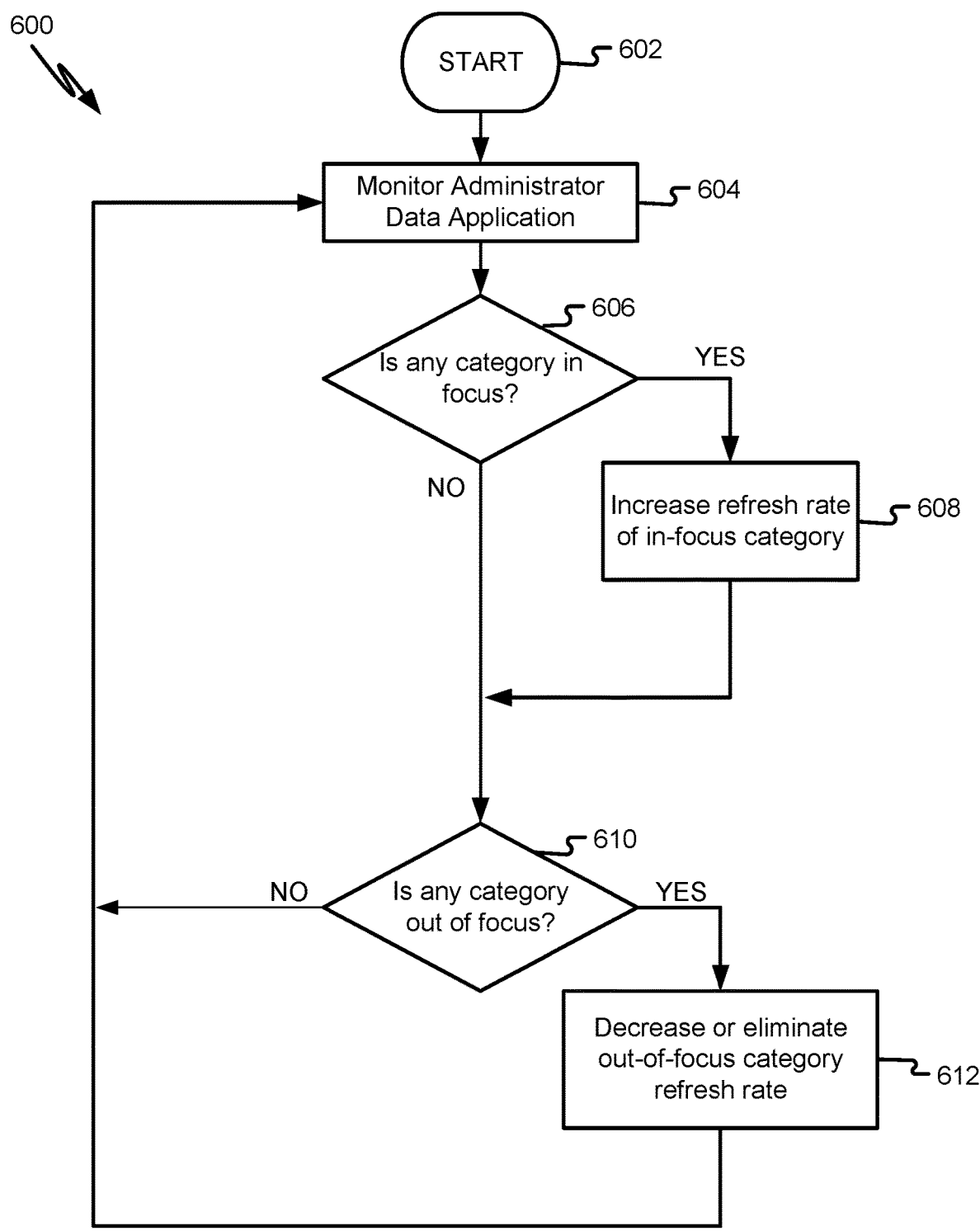
FIG. 6 depicts a flowchart for a method of determining a category of data to refresh for a monitored administrator data application according to an embodiment of the present disclosure.

Referring to FIG. 6, a method 600 of adjusting refresh rates of categories of data is illustrated. The method begins at step 602, and proceeds to step 604, in which an administrator data application is monitored.

Next, the method proceeds to step 606 in which the system determines whether any category is in focus. This may involve determining whether a particular category of information is currently displaying on a screen of an administrator using the administrator data application. For example, an administrator may be viewing the performance of three agent queues (A, B, and C). The contact manager may notice an issue in agent queue C, and the manager may drill further into agent queue C reporting. By viewing details of agent queue C, the agent queue C category will be "in-focus" while the categories of agent queues A and B will be "out-of-focus."

Among the data stored in the server may be a set of agent queues. Agents using agent devices may be assigned to agent queues based upon the skills that they possess. An agent may have multiple skills, and hence may be assigned to multiple agent queues simultaneously. Also, an agent may have different levels of skill expertise, and hence may be assigned to different queues at different expertise levels. The data may contain a variety of enterprise information. For example, the data can include contact- or customer-related information, such as customer name, customer contact information, customer financial information, customer transaction history, customer class or type, account number, and the like, agent- or agent-related information, such as agent name, agent state, agent skill(s) and/or skill level(s), agent queue associations, and the like, contact center current and historic performance information, and other information that can enhance the value and efficiency of the contact processing. The data stored on the server may be configured according to a relational database architecture, an object oriented database architecture, or configured for access by another type of database architecture. Additionally, the data repository or storage may be simply a collection of one or more data files, wherein the data therein may be ordered or unordered.

If the system determines no category is in-focus, the method skips forward to step 610. On the other hand, if the system determines there is an in-focus category, the system moves to step 608 in which the refresh rate of data within the in-focus category is increased. Following step 608, the system proceeds to step 610.

At step 610, the system determines whether any category is out-of-focus. If no category is determined to be out-of-focus, the method returns to step 604. If a category is determined to be out-of-focus, the method proceeds to step 612 in which the refresh rate of the out-of-focus category is decreased or eliminated. In this way, the database resource contention will be reduced to a high efficiency and the system performance will improve.

Following step 612, the method proceeds to step 604. By repeating the steps of the method, the system can actively update the refresh rate of categories, such that when a window is back in focus, then data is again refreshed at the rate initially specified.

Figure 7:
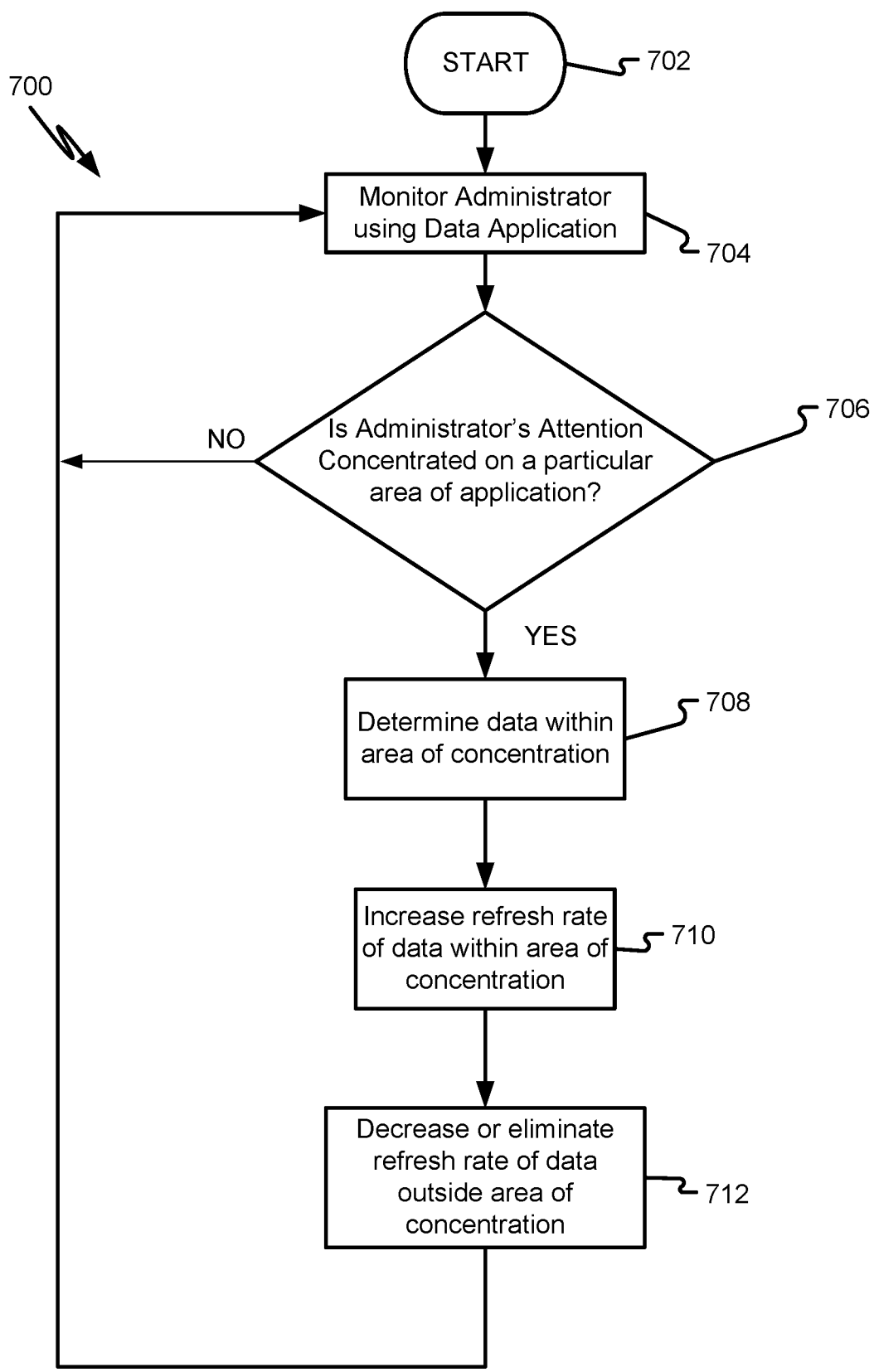
FIG. 7 depicts a flowchart for a method of adjusting a refresh rate based on a number of considerations for an administrator data application according to an embodiment of the present disclosure.

Referring to FIG. 7, another method 700 of adjusting refresh rates for data is illustrated. Such a method as illustrated in FIG. 7 may be implemented in the scenario of when an administrator is running one or more reports with high refresh rates but concentrating his attention on a small area of the report.

Refresh rates may be set automatically by the administrator device or by the server for all administrator devices. Conversely, an administrator may manually set a refresh rate for a particular table or group of tables. Example refresh rates may be as an example, every second, every five second, every minute, every hour, or daily. A table with a high refresh rate may be one where the table auto-refreshes more often than every 30 seconds depending on the situation. In some situations, a high refresh rate may be at an interval of less than a second.

Rules may be defined to reduce client and server load based on the attention given to a visible area of the report. The intelligence component may monitor the administrator using the administrator device in a number of ways, (e.g., using cameras and other human/computer interfaces), to determine where the administrator's concentration is focused. For example, eye-scanning technology may be implemented to determine an area of the screen that the administrator is reviewing. On the other hand, one window containing a table of data may be sized larger than others. The administrator device may determine such a window is "in-focus."

Data outside of the focus of the administrator may have the refresh rate reduced while data within the focus area have the refresh rate maintained or increased. If the administrator appears to no longer be concentrating on a specific area, the report may return to refreshing data based on other active rules. Again, eye-scanning technology may be used to determine that an administrator using the device is not reviewing the data within the table, or perhaps a window may be sized smaller than other windows on the administrator device screen. Rules may be implemented to lower or eliminate the refresh rate of these windows or areas of tables.

The method begins at step 702 and proceeds to step 704, in which an administrator data application is monitored. This monitoring step may be performed using any variety of methods. Essentially, at step 706 the system determines whether the administrator's attention is concentrated on a particular area of the application. For example, portions of the data may be hidden from display, the administrator may have only one page of data open, or possibly particular pages of data may be minimized while others remain displayed.

If the system does not find that the administrator's attention is concentrated on a particular area of the application, the method returns to step 704, where the system continues monitoring the administrator data application. On the other hand, if the system does find that the administrator's attention is concentrated on a particular area of the application, the method proceeds to step 708. At step 708, the system determines what data is within the area of concentration, before proceeding to step 710. By determining what data is within the area of concentration, the system will be able to update the refresh rates of portions of data such that the refresh is performed in an efficient manner.

At step 710, the system may increase the refresh rate of data within the area of concentration, before proceeding to step 712. At step 712, the system may decrease or eliminate the refresh rate of data outside the area of concentration.

Figure 8:
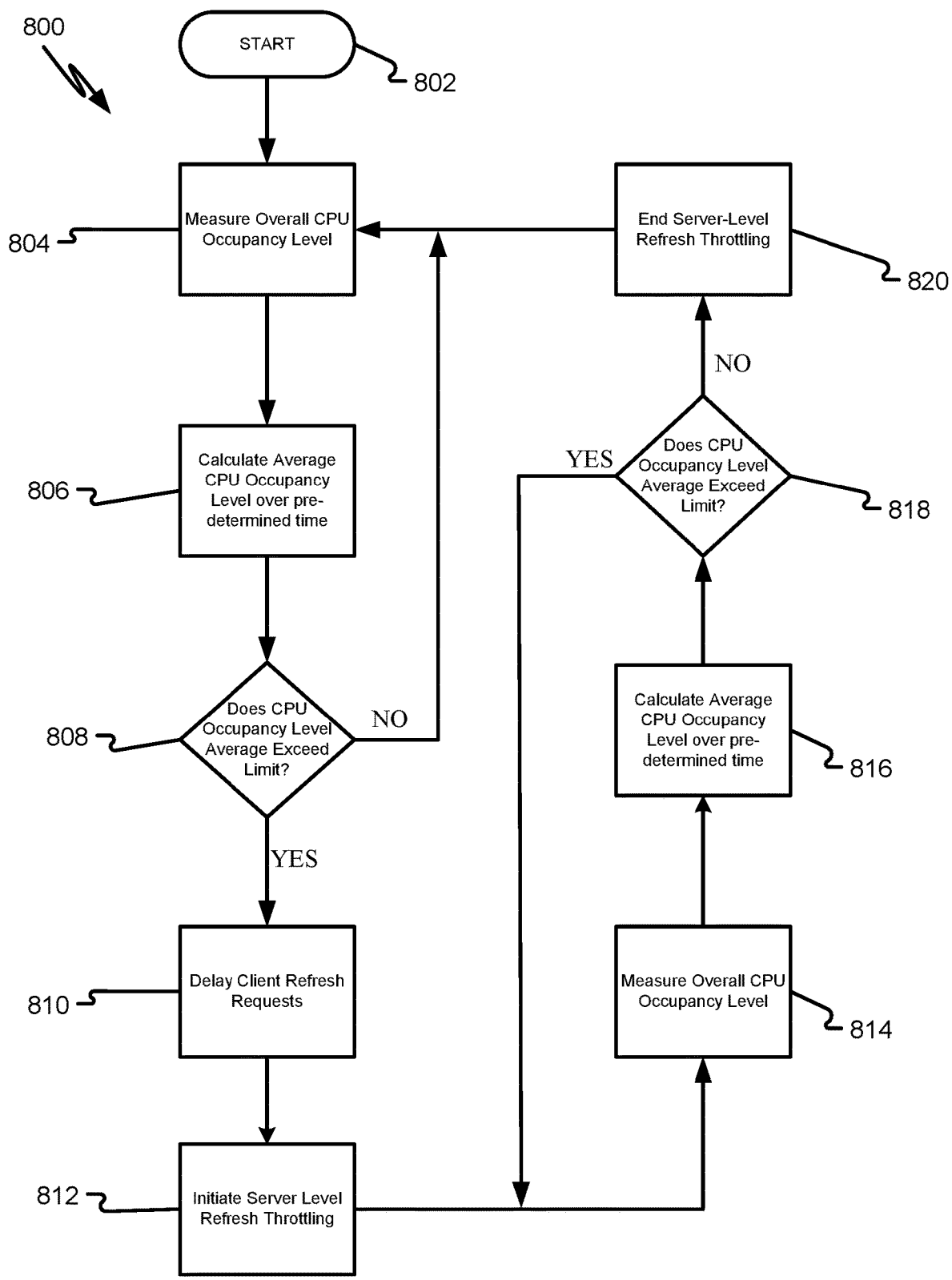
FIG. 8 depicts a flowchart for a method of adjusting and delaying client refresh requests based on CPU occupancy level of a server and implementing server throttling according to an embodiment of the present disclosure.

Referring to FIG. 8, a method 800 of a server-based data query refresh throttling is illustrated. This method may be implemented in an embodiment where a number of administrator devices are on a network. When a great number of administrator devices repeatedly request refreshed data across the network, the overall network speed may suffer. This detrimental effect of repeated refresh requests on the server can be addressed through an intelligent server-based data query refresh throttling.

The flexibility of the rules engine allows for many variations of how these scenarios can be handled. For instance, certain high priority administrators may be given special handling to only delay the interval time for their reporting refreshes by a maximum of 10%. All lower priority administrators may be delayed or suspended as necessary to maintain the server CPU occupancy. There may also be additional fine-tuning related to how long a detected overload needs to be active before action is taken. The period of "return from overload" before action is taken can also be manipulated.

The method begins at step 802 and proceeds to step 804. At step 804, the system measures an overall CPU occupancy level and proceeds to step 806.

At step 806, the system calculates an average CPU occupancy level over a pre-determined time and proceeds to step 808. As an example, inputs to the intelligence component rules engine may indicate 82% CPU occupancy for 31 seconds.

At step 808, the system determines whether the CPU occupancy level average exceeds a limit. To continue the example, rules may be defined on a server reporting system that overall CPU occupancy is not to exceed an average of 80% for more than 30 seconds. Rules are also defined as to how administrator refresh rates will be relaxed or suspended.

If the system determines that the CPU occupancy level average does not exceed the limit, the method returns to step 804 to continue measuring the CPU occupancy level. If the system determines that the CPU occupancy level average does exceed the limit, the method proceeds to step 810.

At step 810, the system acts by delaying administrator refresh requests and proceeds to step 812. By delaying client refresh requests, the system will refuse to grant refresh requests until the CPU occupancy level average is below the limit. Upon decreasing to less than the limit, the system will proceed to grant the delayed client refresh requests.

At step 812, the system initiates server level refresh throttling. Server level refresh throttling may involve a number of measures to decrease the CPU occupancy level average. As the throttling begins, a broadcast message may be sent to all administrators indicating an overload on the server reporting system. The intelligence component may immediately delay administrator refresh requests. Administrators may also start automatically relaxing or suspending refresh requests and reducing query data scope based on defined rules. Following step 812, the method proceeds to step 814.

At step 814, the system measures the overall CPU occupancy level and proceeds to step 816. At step 816, the system calculates the average CPU occupancy level over a pre-determined amount of time and proceeds to step 818.

At step 818 the system determines whether the CPU occupancy level average exceeds the limit. If the system determines the CPU occupancy level average exceeds the limit, the method returns to step 814 to continue measuring the occupancy level until the average is below the limit. If the system determines the CPU occupancy level average does not exceed the limit, the method proceeds to step 820.

As an example, as the reporting server system CPU occupancy decreases to less than 80%, the reporting server gradually reduces refresh request delays. A message is broadcast to all reporting clients indicating a return to normal operation. Clients also gradually return to original refresh rate requests and the system resumes suspended requests.

At step 820, the system ends the server-level refresh throttling, wherein the server continues accepting refresh requests at a normal level, and returns to step 804.

Figure 9:
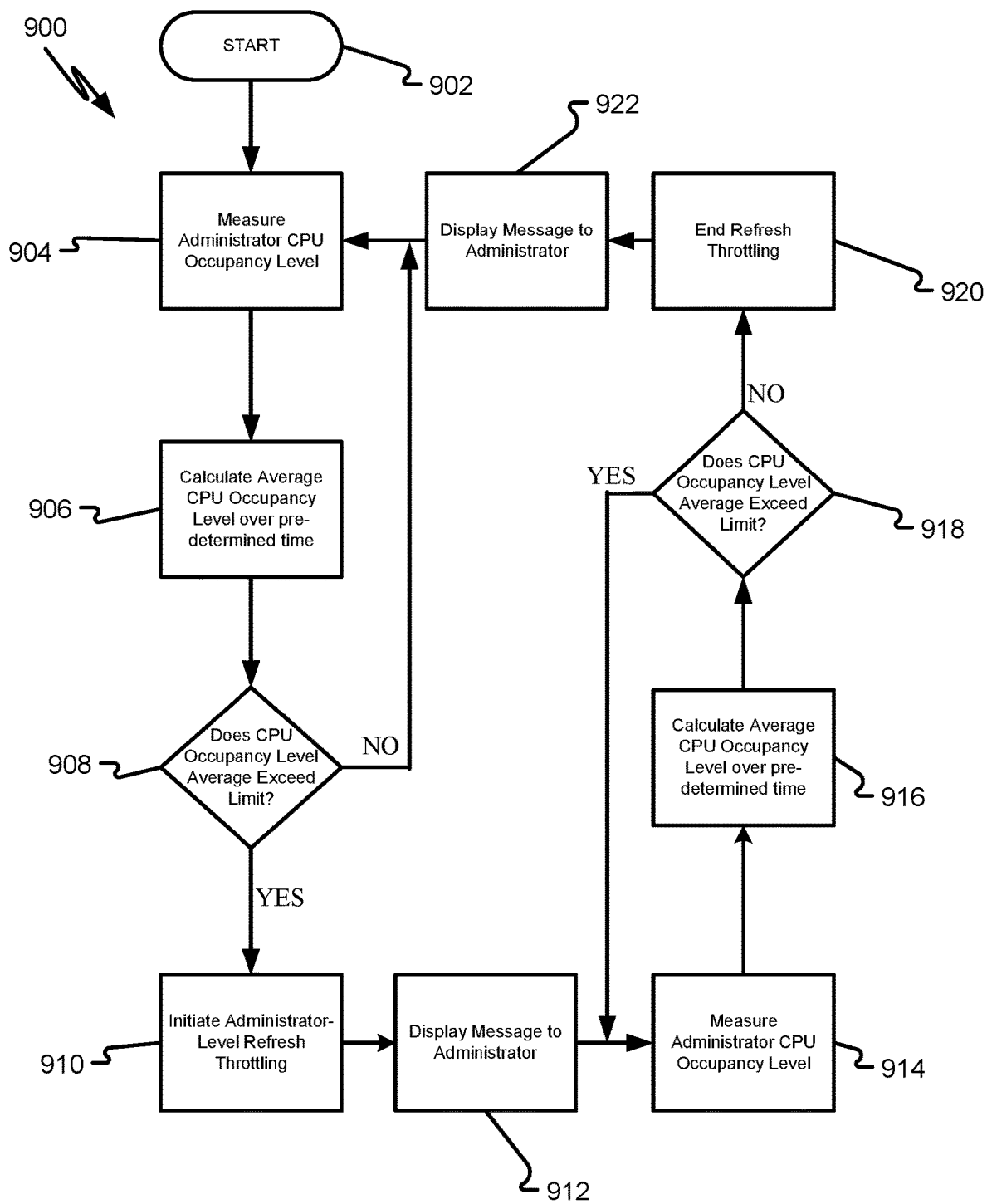
FIG. 9 depicts a flowchart for a method of implementing administrator-level refresh throttling based on a number of factors and calculations according to an embodiment of the present disclosure.

Referring to FIG. 9, a method 900 of administrator-level throttling is illustrated. This method may be implemented in such a scenario as when an administrator's device is running several reports, many of which are run at a very high refresh rate. The administrator's device may also be responsible for one or more important non-reporting background tasks. Rules may be defined to limit administrator device CPU occupancy to no more than 40% for 15 seconds.

As an example, inputs to an administrator device's intelligence component rules engine may indicate 50% CPU occupancy for 16 seconds. The intelligence component on the administrator device may immediately reduce reporting refresh rates, scope of queried data, and/or suspend reporting based on defined rules. A status message may be displayed to the administrator device.

If the CPU occupancy reverts back to less than 40%, data query refresh rates and query scopes are gradually returned to their original values and suspended queries are resumed. If the CPU occupancy again goes back up to an unacceptable value, the cycle will repeat. Based on rules, the administrator may be alerted to the fact reporting is currently too expensive with everything suspended or certain reports will be allowed to continue running while others will be suspended indefinitely.

The method begins at step 902 and proceeds to step 904. At step 904, the system measures an administrator device's CPU occupancy level and the method proceeds to step 906. At step 906, the system calculates the average administrator device's CPU occupancy level over a pre-determined amount of time, and proceeds to step 908.

At step 908, the system determines whether the administrator device's CPU occupancy level average exceeds a limit. This limit may be a pre-set user setting on the administrator device or a general setting on a server/network level. If the system determines the administrator device's CPU occupancy level average does not exceed the limit, the method returns to step 904, and resumes measuring the administrator device's CPU occupancy level.

If the system determines the Administrator device's CPU occupancy level average does exceed the limit, the method proceeds to step 910. At step 910, the system initiates administrator-level refresh throttling and the method proceeds to step 912.

Administrator-level refresh throttling may be implemented in a situation where one administrator device creates a relatively unusually high demand on the server. An administrator-level refresh throttle may only affect one administrator device while other administrator devices may continue requesting a refresh of data at a normal level.

At step 912, the system displays a message to the administrator device, such that an administrator at the administrator device may be on notice that an administrator-level refresh throttling has been initiated. Next, the method proceeds to step 914.

At step 914, the system measures the administrator device CPU occupancy level and the method proceeds to step 916. At step 916, the system calculates the average CPU occupancy level over a pre-determined amount of time, and the method proceeds to step 918.

At step 918, the system determines whether the CPU occupancy level average exceeds the limit. If the CPU occupancy level average is determined to exceed the limit, the method returns to step 914, where the system continues to monitor and measure the administrator device CPU occupancy level. If the CPU occupancy level average is determined not to exceed the limit, the method proceeds to step 920.

At step 920, the system ends the refresh throttling, and the method proceeds to step 922. When the refresh throttling has ended, the administrator device will be enabled to make refresh requests on demand and at the usual rate.

At step 922, the system displays a new message to the administrator device, such that the administrator at the administrator device will be notified that the administrator level throttling has ended. At this point, the method returns to step 904 and continues monitoring and measuring the administrator device's CPU occupancy level.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any graphical representation of open communication lines. Those skilled in the art will readily recognize various modifications and changes that may be made to the principles described herein without following the example embodiments and applications illustrated and described herein, and without departing from the spirit and scope of the disclosure.

What is claimed:

1. A method of refreshing data on an administrator device, the method comprising:
   generating, by a processor of the administrator device, a refresh request associated with a plurality of cells of data to be refreshed;
   identifying, by the processor of the administrator device, one or more of the plurality of cells of data to be refreshed to remove from the refresh request;
   creating, by the processor of the administrator device, a minimized refresh request by removing the association of the one or more of the plurality of cells of data from the refresh request, wherein the minimized refresh request is of a lesser amount of data compared to the refresh request;
   transmitting, by the processor of the administrator device, the minimized refresh request to a server;
   receiving, at the processor and from the server, refreshed data comprising cells associated with the cells of data associated with the minimized refresh request; and
   replacing, by the processor of the administrator device, the plurality of cells of data to be refreshed with the minimized refreshed data.

2. The method of claim 1, wherein the refresh request is generated automatically based on a time interval.

3. The method of claim 2, further comprising:
   determining whether the one or more of the plurality of cells of data to be refreshed are identified to be in-focus; and
   based on the determination, decreasing the time interval.

4. The method of claim 2, further comprising:
   determining whether the one or more of the plurality of cells of data to be refreshed are identified to be out-of-focus; and
   based on the determination, decreasing the time interval.

5. The method of claim 1, wherein the refresh request is generated manually by an administrator using the administrator device.

6. The method of claim 1, wherein the one or more of the plurality of cells of data to be refreshed are identified according to one or more administrator-level rules.

7. The method of claim 1, further comprising, prior to removing the association:
   determining that the administrator device is running a screensaver; and
   wherein, based on the determination that the administrator device is running a screensaver, creating the minimized refresh request comprises removing the association of all of the plurality of cells of data.

8. The method of claim 1, further comprising, prior to removing the association:
   determining that the administrator device is locked; and
   wherein, based on the determination that the administrator device is locked, creating the minimized refresh request comprises removing the association of all of the plurality of cells of data.

9. The method of claim 1, further comprising, prior to removing the association:
   determining that an administrator is not physically present at the device; and
   wherein, based on the determination that the administrator is not physically present at the device, creating the minimized refresh request comprises removing the association of all of the plurality of cells of data.

10. The method of claim 1, further comprising, prior to removing the association:
    determining one or more of the plurality of cells of data to be refreshed are not visible on a display of the administrator device; and
    wherein, based on the determination of the one or more of the plurality of cells of data to be refreshed are visible on a display of the administrator device, creating the minimized refresh request comprises removing the association of the one or more of the plurality of cells of data to be refreshed.

11. The method of claim 1, further comprising, prior to removing the association:
    determining a portion of a first window on a display of the administrator device and the first window is hidden behind a second window displayed on the display; and
    determining one or more cells requested in the refresh request are within the portion of the first window;
    wherein creating the minimized refresh request comprises removing the association of the one or more cells in addition to removing the association of the one or more of the plurality of cells of data.

12. A system for delivering refreshed data to an administrator device, the system comprising:
    a server comprising:
      a memory;
      a first processor in communication with the memory, wherein the first processor:
        receives a refresh request associated with a plurality of cells of data to be refreshed on the administrator device;
        identifies one or more of the plurality of cells of data to be refreshed to remove from the refresh request;
        creates a minimized refresh request by removing the association of the one or more of the plurality of cells of data from the refresh request, wherein the minimized refresh request is of a lesser amount of data compared to the refresh request;
        retrieves data corresponding to the cells of data associated with the minimized refresh request; and
        transmits the data corresponding to the cells of data associated with the minimized refresh request to the administrator device.

13. The system of claim 12, wherein the one or more of the plurality of cells of data to be refreshed are identified according to one or more server-level rules.

14. The system of claim 12, wherein the processor:
    determines a CPU Occupancy Level Average of the server exceeds a limit; and
    initiates a server-level refresh throttling.

15. The system of claim 14, wherein the processor:
    determines the CPU Occupancy Level Average of the server is below the limit; and
    ends the server-level refresh throttling.

16. The system of claim 14, wherein the server-level refresh throttling comprises the processor delaying retrieving data corresponding to the cells of data associated with the refresh request until the server-level refresh throttling ends.

17. The system of claim 12, wherein the processor, prior to retrieving data:
    determines a second one or more of the plurality of cells to be refreshed were previously refreshed within a time interval;
    wherein creating the minimized refresh request comprises removing the association of the second one or more of the plurality of cells of data from the refresh request.

18. The system of claim 17, wherein the time interval is set based on how often data associated with the second one or more of the plurality of cells changes.

19. The system of claim 12, wherein the processor:
    receives a second refresh request from the administrator device;
    determines the second refresh request was received outside a time limit; and
    retrieves data associated with the second refresh request.

20. The system of claim 12, wherein the one or more of the plurality of cells of data are identified based on an associated row or column.

* * * * *